US011863462B2

(12) United States Patent
Ono et al.

(10) Patent No.: US 11,863,462 B2
(45) Date of Patent: Jan. 2, 2024

(54) RESOURCE ALLOCATION APPARATUS, RESOURCE ALLOCATION METHOD AND RESOURCE ALLOCATION PROGRAM

(71) Applicant: Nippon Telegraph and Telephone Corporation, Tokyo (JP)

(72) Inventors: Kotaro Ono, Musashino (JP); Ryota Ishibashi, Musashino (JP); Takuma Tsubaki, Musashino (JP); Naoki Higo, Musashino (JP); Yuki Nakahara, Musashino (JP); Takeshi Kuwahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 37 days.

(21) Appl. No.: 17/629,079

(22) PCT Filed: Jul. 23, 2019

(86) PCT No.: PCT/JP2019/028807
§ 371 (c)(1),
(2) Date: Jan. 21, 2022

(87) PCT Pub. No.: WO2021/014556
PCT Pub. Date: Jan. 28, 2021

(65) Prior Publication Data
US 2022/0255878 A1 Aug. 11, 2022

(51) Int. Cl.
H04L 47/70 (2022.01)
H04W 28/26 (2009.01)
H04L 47/83 (2022.01)

(52) U.S. Cl.
CPC ............ H04L 47/70 (2013.01); H04W 28/26 (2013.01); H04L 47/823 (2013.01); H04L 47/83 (2022.05)

(58) Field of Classification Search
CPC ....... H04L 47/70; H04L 47/83; H04L 47/823; H04W 28/26; H04W 28/0284; H04W 4/023; H04W 4/025; H04W 4/029
See application file for complete search history.

(56) References Cited

U.S. PATENT DOCUMENTS

2013/0046879 A1* 2/2013 Garcia ............. H04W 28/0284
709/224
2013/0157684 A1* 6/2013 Moser ................... H04W 4/023
455/456.1

(Continued)

OTHER PUBLICATIONS

[No. Author Listed], "Resource Management Guide ESX Server 3.0.1 and VirtualCenter 2.0.1," VMware, Inc., 2006, 401 pages (with English Translation).

(Continued)

Primary Examiner — Jungwon Chang
(74) Attorney, Agent, or Firm — Fish & Richardson P.C.

(57) ABSTRACT

A resource allocation device includes: a course estimation unit that estimates a course of each mobile terminal based on a location of a mobile terminal acquired from a network device, and estimates a probability that each mobile terminal is located in each area at time of prediction; a determination unit that calculates, for each area, the number of mobile terminals in the area using the probability and determines whether the maximum value of an overcommit ratio for each area exceeds an upper limit; and an execution unit that executes the allocation or release of resources to an MEC server group located in each area when the maximum value of the overcommit ratio is equal to or less than the upper limit, and refrains from executing the allocation or release of the resources to the MEC server group when the maximum value of the overcommit ratio exceeds the upper limit.

18 Claims, 11 Drawing Sheets

(56) References Cited

U.S. PATENT DOCUMENTS

| | | | |
|---|---|---|---|
| 2013/0346548 A1* | 12/2013 | Lanfranchi | H04L 67/04 |
| | | | 709/217 |
| 2014/0200036 A1* | 7/2014 | Egner | H04W 64/00 |
| | | | 455/456.3 |
| 2016/0057639 A1* | 2/2016 | Smith | H04W 4/029 |
| | | | 455/423 |
| 2017/0150318 A1* | 5/2017 | Mappus | H04W 4/025 |
| 2019/0212155 A1* | 7/2019 | Gordon | G01C 21/3438 |

OTHER PUBLICATIONS

Kekki et al., "MEC in 5G Networks," ETSI White Paper No. 28, First Edition, Jun. 2018, 28 pages.

* cited by examiner

Fig. 5

COURSE ESTIMATION RESULT AT TIME t = 3 (a.u.) (UNIT: %)

| | AREA A-1-α | AREA A-1-β | AREA A-1-γ | AREA A-1-δ |
|---|---|---|---|---|
| TERMINAL a | 0 | 0 | 90 | 10 |
| TERMINAL b | 0 | 0 | 90 | 10 |
| TERMINAL c | 75 | 10 | 10 | 5 |
| TERMINAL d | 75 | 10 | 10 | 5 |
| TERMINAL e | 0 | 90 | 0 | 10 |
| TERMINAL f | 0 | 90 | 0 | 10 |

Fig. 6

DETERMINATION RESULT FOR EACH AREA AT TIME t = 3 (a.u.)

| | AREA A-1-α | AREA A-1-β | AREA A-1-γ | AREA A-1-δ |
|---|---|---|---|---|
| NUMBER OF TERMINALS IN AREA (EXPECTED VALUE) | 1 × (0+0+0.75+0.75+0+0)=1.5 (TERMINALS) | 2 TERMINALS | 2 TERMINALS | 0.5 TERMINALS |
| RESOURCES TO BE COMMITTED (SINCE RESOURCES ARE COMMITTED BASED ON DISCRETE VALUES IN UNITS OF NUMBER OF TERMINALS, EXPECTED VALUE OF NUMBER OF TERMINALS IN AREA IS ROUNDED UP) | COMMIT RESOURCES FOR TWO TERMINALS | COMMIT RESOURCES FOR TWO TERMINALS | COMMIT RESOURCES FOR TWO TERMINALS | COMMIT RESOURCES FOR ONE TERMINAL |
| OVERCOMMIT RATIO | 1 | 1 | 1 | 0.5 |

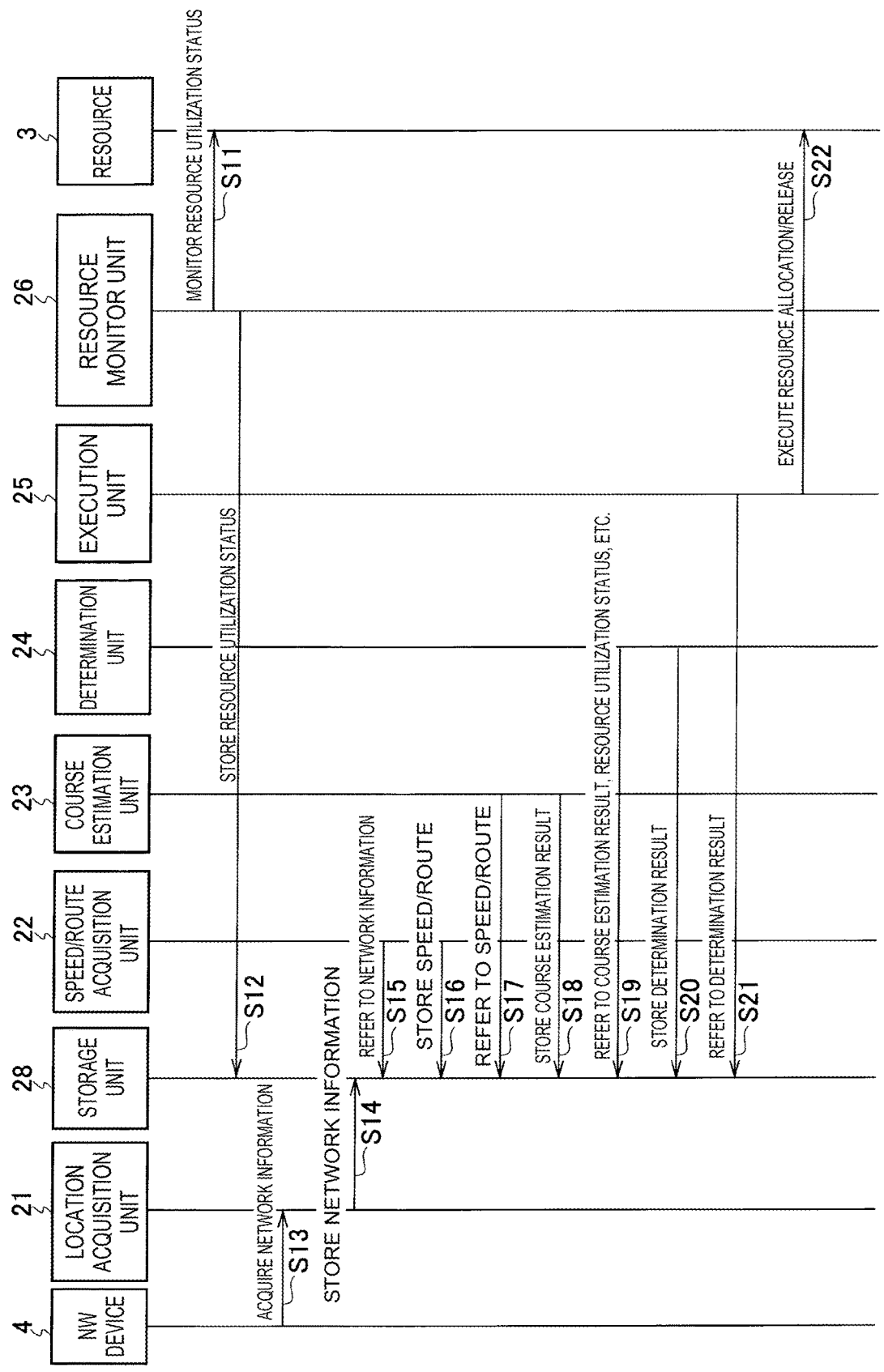

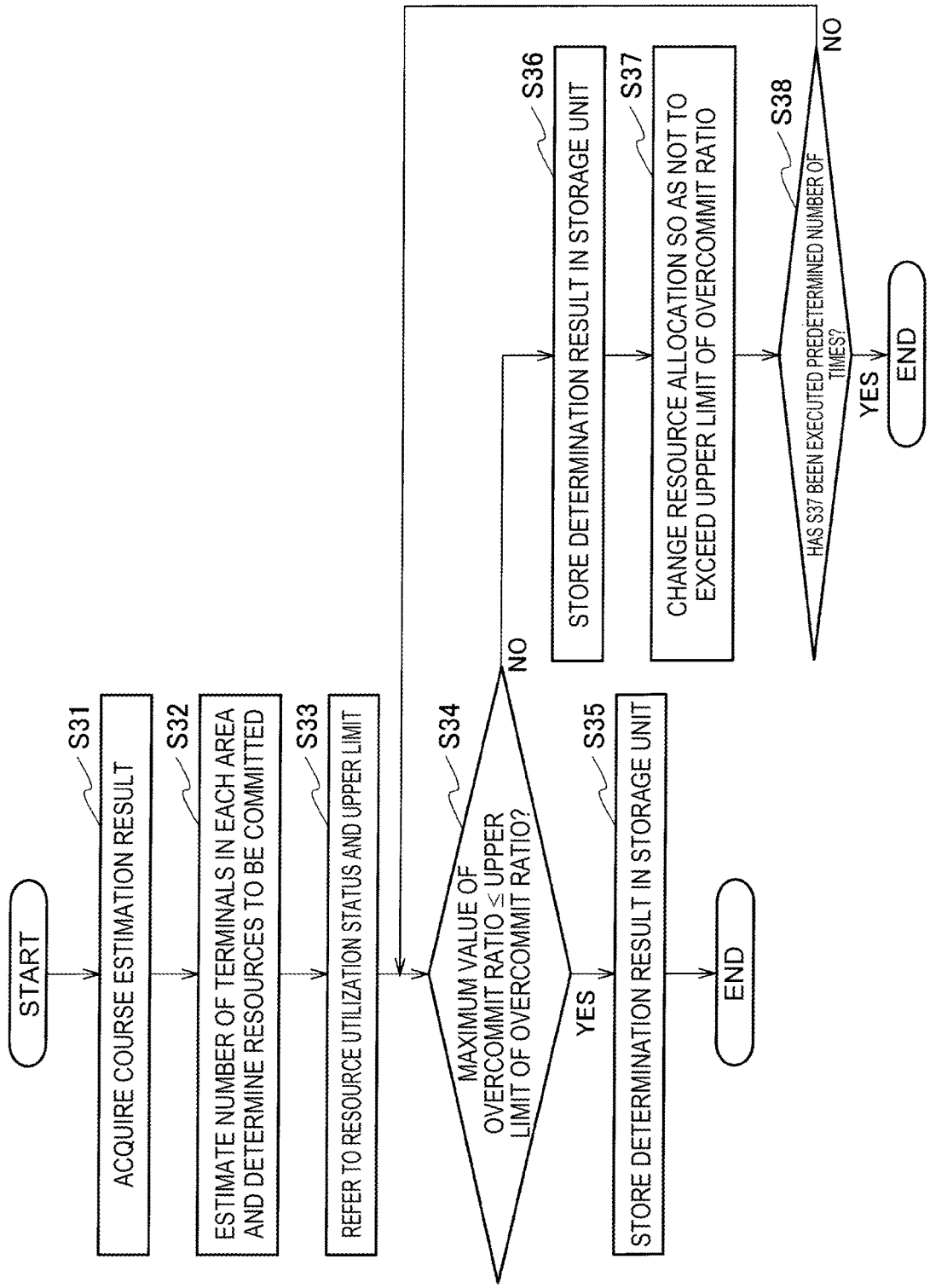

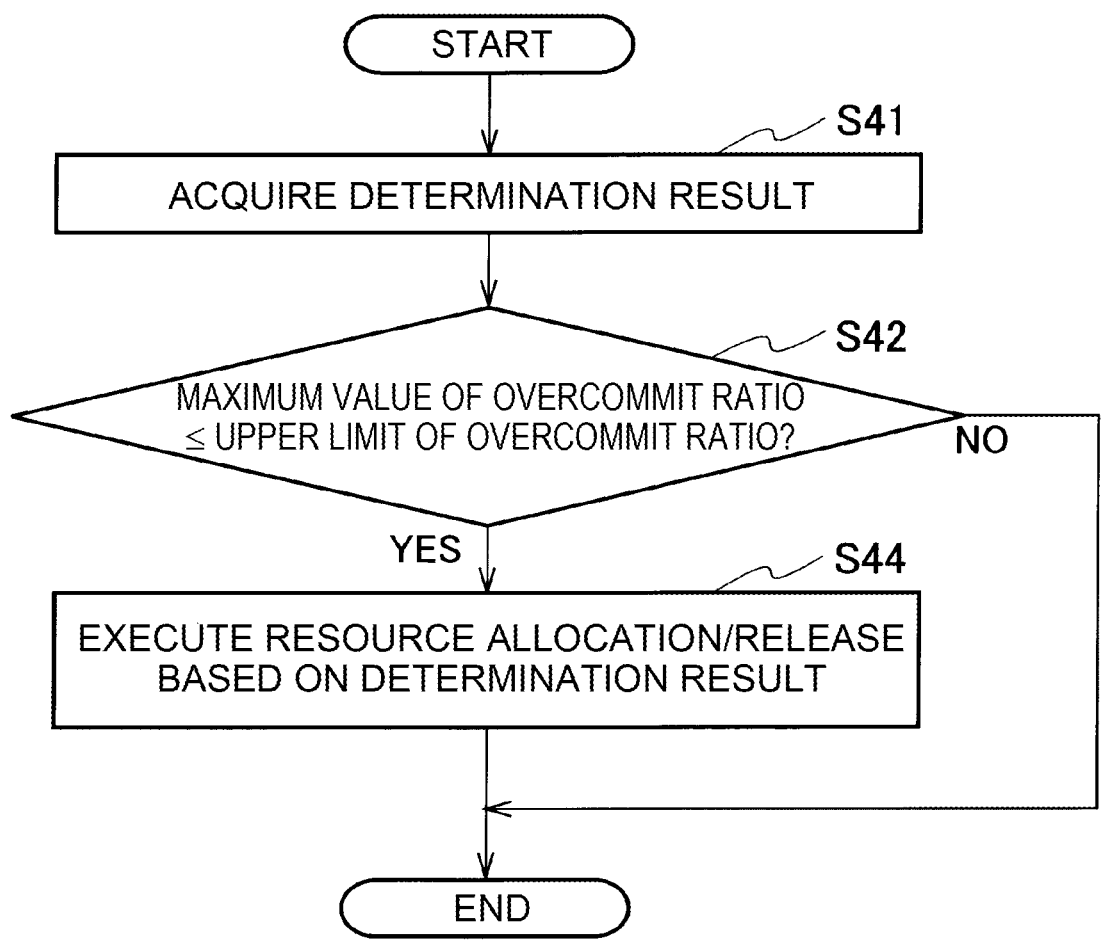

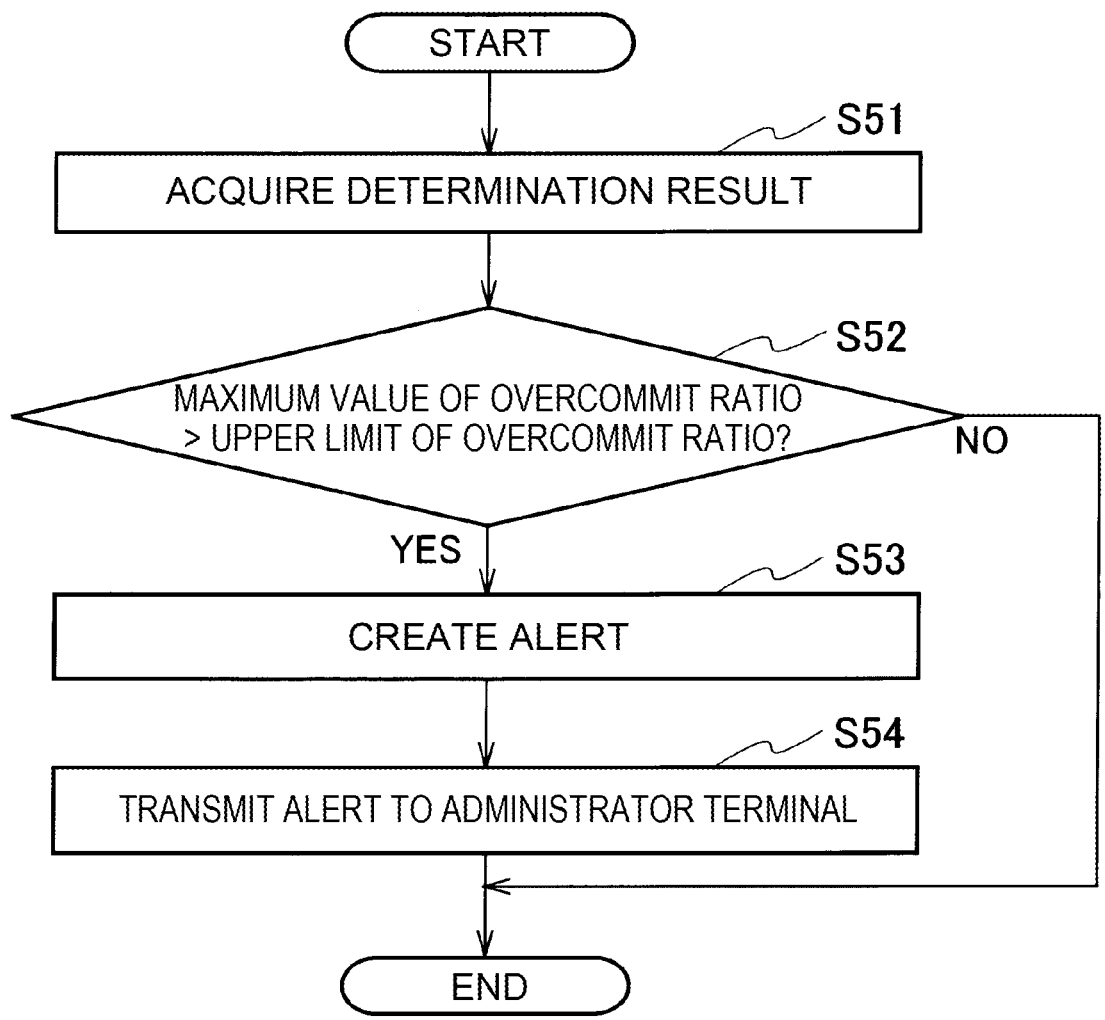

RESOURCE ALLOCATION APPARATUS, RESOURCE ALLOCATION METHOD AND RESOURCE ALLOCATION PROGRAM

CROSS-REFERENCE TO RELATED APPLICATIONS

This application is a National Stage application under 35 U.S.C. § 371 of International Application No. PCT/JP2019/028807, having an International Filing Date of Jul. 23, 2019, the disclosure of which is considered part of the disclosure of this application, and is incorporated in its entirety into this application.

TECHNICAL FIELD

The present invention relates to a resource allocation device, a resource allocation method, and a resource allocation program.

BACKGROUND ART

There is a system in which a cloud server, a group of MEC (Multi-access Edge Computing) servers having a hierarchical structure according to a regional division, and terminals are connected via a network. In the system, an MEC server is a server that is physically distributed in the vicinity of a terminal, and processes various types of information (see Non-Patent Literature 1).

The MEC server enables the distribution and sophistication of various functions and processes previously implemented on the cloud server or terminal side. Thus, in addition to services that require low latency, support for new areas of services such as services that aggregate large amounts of information, and services that require high-speed processing is considered.

Further, virtualization technology is put to practical use, which virtualizes and utilizes physical resources such as CPU and memory included in a physical server. In such a virtual environment, overcommitment is considered as the technology for improving resource utilization efficiency. Overcommitment allocates virtual resources to a virtual server that exceed the capacity of the physical resources that actually exist (see Non-Patent Literature 2).

Since the CPU and memory are not always used fully, establishing a multiplier that allows overcommitment while considering stable operation improves the aggregation rate of virtual servers to physical servers, and efficiently uses physical resources. The overcommitment multiplier is established based on the specifications of the physical resources such as CPU and memory, an assumed utilization rate and the like.

CITATION LIST

Non-Patent Literature

Non-Patent Literature 1: "MEC in 5G networks", ETSI White Paper No. 28, Jun. 20, 2018
Non-Patent Literature 2: "Resource Management Guide ESX Server 3.0.1 and Virtual Center 2.0.1", vmware

SUMMARY OF THE INVENTION

Technical Problem

MEC servers that are geographically distributed in a hierarchical structure have quantitative limitations in resource deployment in terms of cost and the like. When a mobile terminal transmits information to an MEC server, and the MEC server processes the information in real time, it is necessary to ensure that the information transmission from the mobile terminal and the information processing on the MEC server are in real time. Therefore, it is necessary for the MEC server at the destination to reserve the necessary resources before the mobile terminal actually moves, and prepare for the transmission of information from the mobile terminal.

On the other hand, the same mobile terminal does not exist in different areas at the same time. Therefore, when the resources of the MEC server group in each area are always reserved for the number of all mobile terminals, the reserved resources are not always used, and the resource utilization efficiency is reduced.

One way to improve resource utilization efficiency in an environment where resources are limited in quantity is to overcommit resources. Uniform overcommitment, however, may cause performance degradation or operational instability. Therefore, the upper limit of the overcommit ratio cannot be raised at the design stage, and the accommodation rate of mobile terminals cannot be improved.

The present invention has been made in view of the above circumstances, and an object of the present invention is to provide a technology that controls overcommitment according to the movement status of a mobile terminal and utilizes resources effectively.

Means for Solving the Problem

In order to achieve the above object, a resource allocation device according to one aspect of the present invention includes: a course estimation unit that estimates a course of each mobile terminal based on network information about a location of the mobile terminal acquired from a network device, and estimates a probability that each mobile terminal is located in each area at time of prediction; a determination unit that calculates, for each area, a number of mobile terminals in the area using the probability and determines whether a maximum value of an overcommit ratio for each area calculated based on the number of mobile terminals in the area exceeds an upper limit; and an execution unit that executes allocation or release of resources to a virtual server group located in each area when the maximum value of the overcommit ratio is equal to or less than the upper limit, and refrains from executing allocation or release of the resources to the virtual server group when the maximum value of the overcommit ratio exceeds the upper limit.

According to one aspect of the present invention, a resource allocation method performed by a resource allocation device, includes: a course estimation step of estimating a course of each mobile terminal based on network information about a location of the mobile terminal acquired from a network device, and estimating a probability that each mobile terminal is located in each area at time of prediction; a determination step of calculating, for each area, a number of mobile terminals in the area using the probability and determining whether a maximum value of an overcommit ratio for each area calculated based on the number of mobile terminals in the area exceeds an upper limit; and an execution step of executing allocation or release of resources to a virtual server group located in each area when the maximum value of the overcommit ratio is equal to or less than the upper limit, and refraining from executing allocation or release of the resources to the virtual server group when the maximum value of the overcommit ratio exceeds the upper limit.

One aspect of the present invention is a resource allocation program for causing a computer to function as the resource allocation device.

Effects of the Invention

According to the present invention, it is possible to provide a technology that controls overcommitment according to the movement status of a mobile terminal and utilizes resources effectively.

BRIEF DESCRIPTION OF DRAWINGS

FIG. 5 shows an example of a course estimation result at time t=3 (a.u.).

FIG. 6 shows an example of a determination result at time t=3 (a.u.).

FIG. 7 is a sequence diagram showing the operation of the resource allocation device.

FIG. 8 is a flowchart showing the operation of a determination unit.

FIG. 9 is a flowchart showing the operation of an execution unit.

FIG. 10 is a flowchart showing the operation of a determination monitor unit.

DESCRIPTION OF EMBODIMENTS

Embodiments of the present invention will be described below with reference to the drawings. In the description of the drawings, the same parts are designated by the same reference signs and the description thereof will be omitted.

First Embodiment (Network Configuration Including MEC Server)

Figure 1:
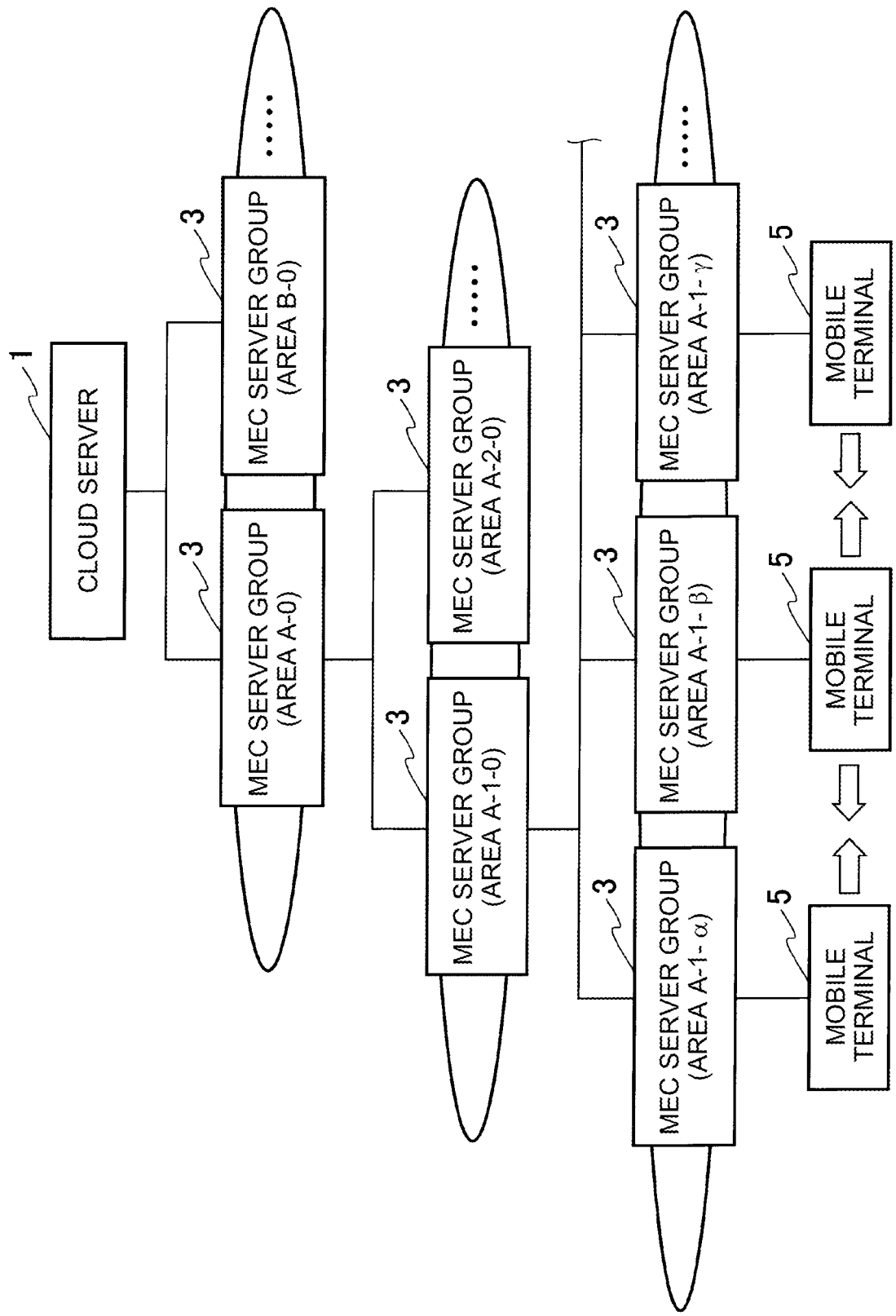
FIG. 1 shows an example of a network configuration including MEC servers according to an embodiment of the present invention.

FIG. 1 shows an example of a network configuration (network system) that includes an MEC server to which resources are allocated according to the present embodiment. The illustrated network configuration includes a cloud server 1, MEC server groups 3, and a plurality of mobile terminals 5. An MEC server group 3 is located between the cloud server 1 and a mobile terminal 5, having a hierarchical structure according to the area. The illustrated mobile terminal 5 moves between areas and connects to an MEC server group closest to the mobile terminal 5 via a base station (radio base station). It is noted that the network configuration is not limited to that shown in FIG. 1, and various configurations can be considered.

The cloud server 1, for example, aggregates information processed in real time by the MEC server group 3 to generate big data, and perform large-scale analysis and the like. More specifically, the cloud server 1 performs overall processing in which the real-time requirements are less stringent than the low-latency processing in the MEC server group 3 located at the edge.

Each MEC server group 3 includes a plurality of virtualized MEC servers. In the present embodiment, the resources of at least one physical server (not shown) are divided into a plurality of MEC servers (MEC server group 3) and used. Each MEC server runs an OS and applications and can be used as if it were an independent computer.

The mobile terminal 5 is a terminal (mobile terminal) that performs wireless communication, such as a smart phone or a feature phone.

(Configuration of Resource Allocation Device)

Figure 2:
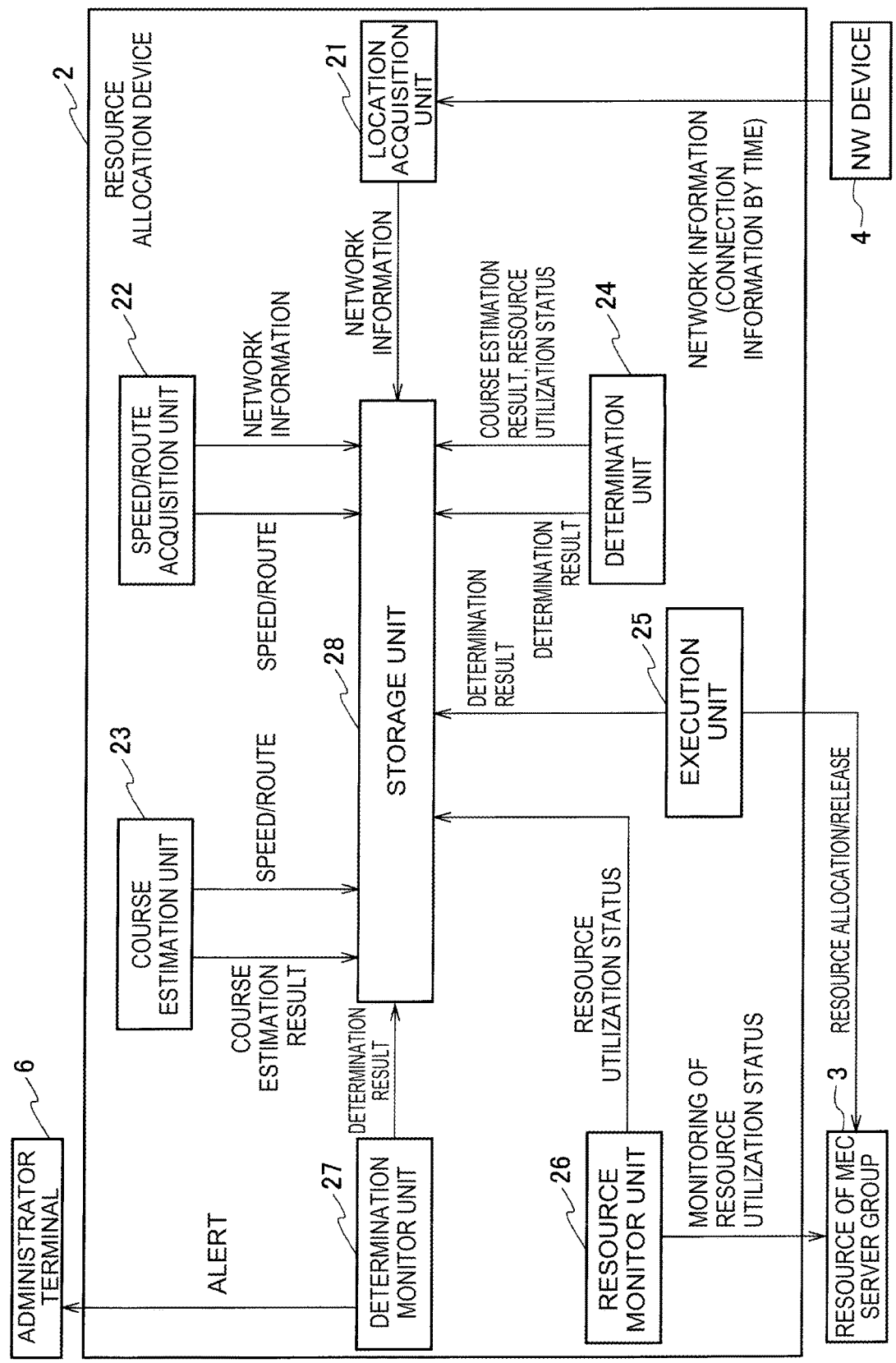
FIG. 2 is a functional block diagram showing a configuration of a resource allocation device.

FIG. 2 is a functional block diagram showing a configuration of a resource allocation device 2 of the present embodiment. The resource allocation device 2 virtualizes the resources of the physical server and allocates the resources to the MEC server group 3. The illustrated resource allocation device 2 includes a location acquisition unit 21, a speed/route acquisition unit 22, a course estimation unit 23, a determination unit 24, an execution unit 25, a resource monitor unit 26, a determination monitor unit 27, and a storage unit 28.

The location acquisition unit 21 acquires network information about the location of the mobile terminal 5 from the network device 4 (NW device), and stores (saves) the network information in the storage unit 28. The network device 4 is, for example, a base station, a device on the core network side or the like. The network information is, for example, connection information between the mobile terminal 5 and the base station. The connection information indicates, for every unit time, which terminal 5 is present in which location (cell of the base station).

Figure 3:
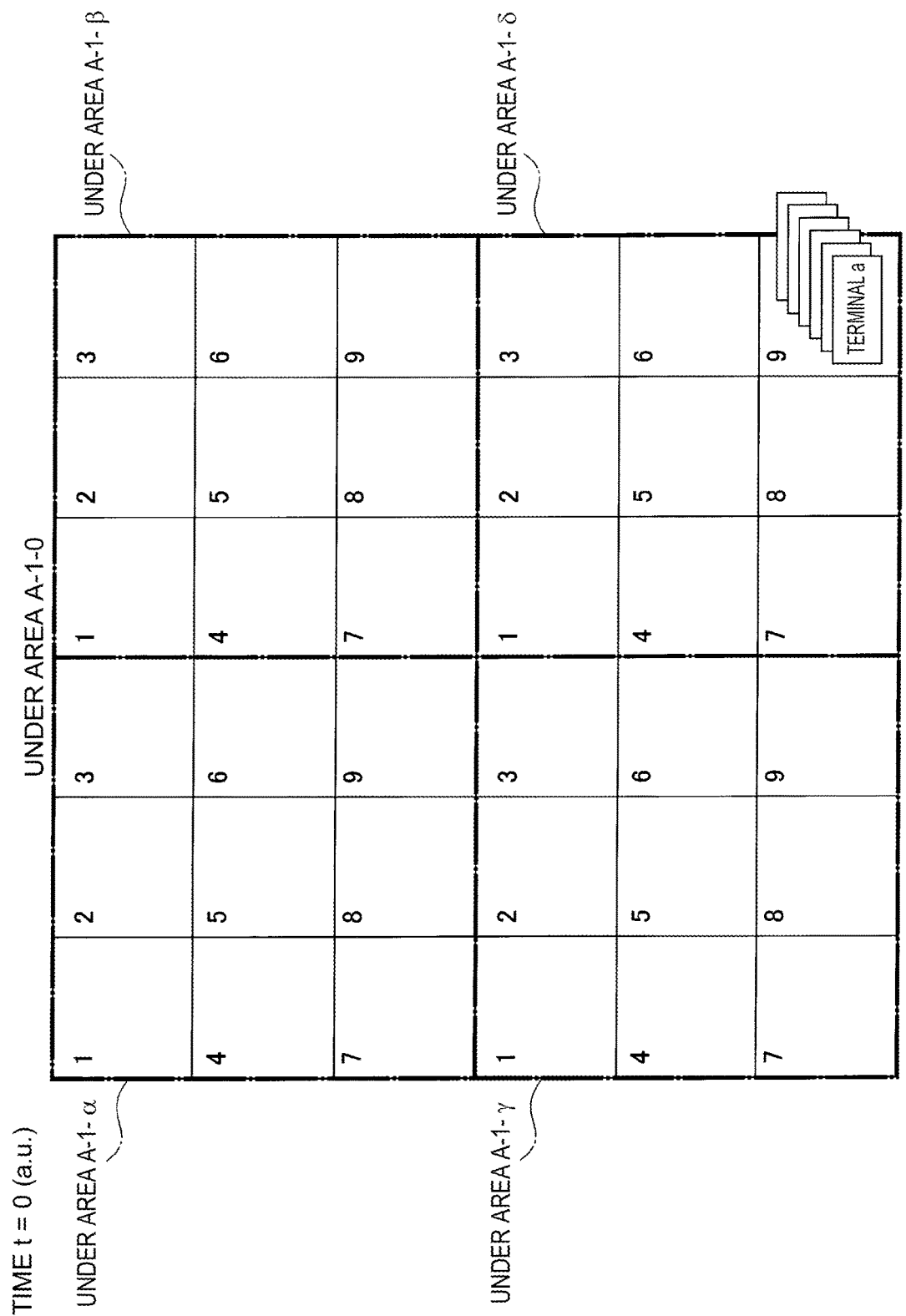
FIG. 3 shows the location of mobile terminals at time t=0 (a.u.).

FIG. 3 shows the location of the mobile terminal 5 at time t=0 (a.u.). Here, an MEC-specific service in which six mobile terminals a, b, c, d, e and f transmit information to each MEC server group in each area (area A-1-α, area A-1-β, area A-1-γ, and area A-1-δ under area A-1-0), and the MEC server group performs real-time processing will be described as an example. Each area consists of squares 1-9. The location acquisition unit 21 uses the network information to acquire the location of each mobile terminal 5 for every unit time as shown in FIG. 8.

The speed/route acquisition unit 22 acquires the movement speed and the movement route of each mobile terminal 5 for every unit time based on the network information stored in the storage unit 28, and stores the acquired movement speed and movement route in the storage unit 28.

Figure 4:
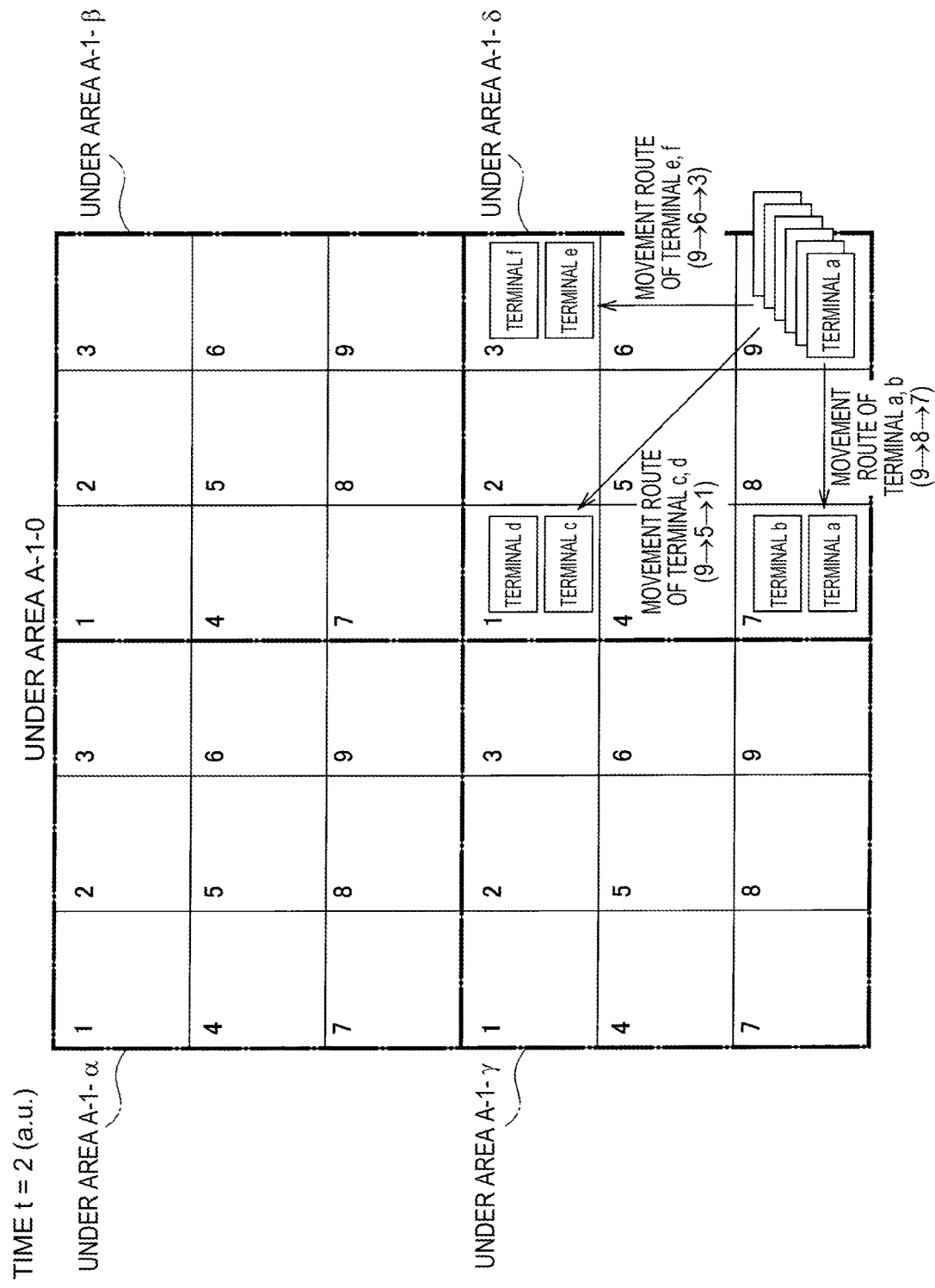
FIG. 4 shows the movement status of the mobile terminals at time t=2 (a.u.).

For example, it is assumed that the mobile terminals a, b, c, d, e and f move from the state at time t=0 (a.u.) shown in FIG. 3 to the state at time t=2 (a.u.) shown in FIG. 4 shows that the mobile terminals a and b move from the squares 9 to 7 via the square 8 in the area A-1-δ, the terminals c and d move from the squares 9 to 1 via the square 5 in the area A-1-δ, and the terminals e and f move from the squares 9 to 3 via the square 6 in the area A-1-δ. It is assumed that each mobile terminal moves at the same speed, which is 1 square/a.u. (arbitrary time unit).

The course estimation unit 23 estimates the course of each mobile terminal 5 based on the network information, and estimates the probability that each mobile terminal 5 is located in each area at the time of prediction. Here, the course estimation unit 23 estimates the course of each mobile terminal using the movement speed and the movement route acquired by the speed/route acquisition unit 22. Specifically, the course estimation unit 23 estimates the course of the mobile terminal 5 for every unit time using the movement speed and the movement route of the mobile terminal 5 acquired from the storage unit 28, and stores the estimation result in the storage unit 28.

FIG. 5 shows an example of a course estimation result at a predicted future time t=3 (a.u.). The illustrated example indicates that the mobile terminals a and b are in the area A-1-γ at a rate of 90%, and in the area A-1-δ at a rate of 10% at time t=3 (a.u.). The method of estimating the course is not particularly specified, but the course may be predicted in an artificial intelligence manner (for example, using a learned model generated by machine learning) after the accumulated past movement speed and movement route are learned, or may be estimated with reference to a predetermined movement plan of the mobile terminal 5.

The determination unit 24 calculates, for each area, the number of mobile terminals 5 in the area using the probability included in the estimation result and determines whether the maximum value of an overcommit ratio for each area calculated based on the number of mobile terminals 5 exceeds the upper limit.

FIG. 6 shows an example of a determination result for each area at time t=3 (a.u.). The determination result includes the number of terminals in the area (expected value), resources to be committed, and an overcommit ratio. The determination unit 24 calculates, for each area, the number of terminals in the area by summing up the percentage of each mobile terminal 5 in the area at time t=3 (a.u.). For example, in the case of the course estimation result shown in FIG. 5, the determination unit 24 calculates the number of terminals in the area A-1-α as 0.75+0.75=1.5, and calculates the number of terminals in the area A-1-β as 0.1+0.1+0.9+0.9=2.

Then, the determination unit 24 uses the calculated number of terminals in each area rounded up to the nearest whole number as the resources to be committed. For example, the determination unit 24 uses "2", which is rounded up from the number of terminals "1.5" in the area A-1-α, as the resources to be committed. Since the resource commitment is performed by a discrete value (integer) in units of the number of mobile terminals 5, here, the value obtained by rounding up a fraction of the number of terminals in the area is used as resources to be committed. It is assumed that the resources required for one mobile terminal 5 are equal.

Then, the determination unit 24 calculates, for each area, the overcommit ratio by the following equation.

Overcommit Ratio=Resources to be committed/Existing resources

The existing resources are the resources currently allocated to the MEC server group, and are stored in the storage unit 28 by the resource monitor unit 26. The determination unit 24 acquires the existing resources of each MEC server group corresponding to each area from the storage unit 28, and calculates the overcommit ratio.

In the example shown in FIG. 6, it is assumed that each MEC server group 3 in each area (area A-1-α, area A-1-β, area A-1-γ, and area A-1-δ) has resources for two mobile terminals. In this case, the determination unit 24 sets the overcommit ratio of the area A-1-α to 2/2=1, and sets the overcommit ratio of the area A-1-δ to 1/2=0.5.

Then, the determination unit 24 compares the maximum value of the calculated overcommit ratio with the upper limit of the overcommit ratio stored in the storage unit 28, and when the maximum value of the overcommit ratio is equal to or less than the upper limit, the determination result including the calculated overcommit ratio is stored in the storage unit 28.

On the other hand, when the maximum value of the overcommit ratio exceeds the upper limit, the determination unit 24 stores the determination result including the calculated overcommit ratio in the storage unit 28, and changes the resource allocation method of the MEC server group 3 so that the overcommit ratio does not exceed the upper limit. Thus, the existing resources in the area where the overcommit ratio exceeds the upper limit may be changed, and the overcommit ratio after the change may become equal to or less than the upper limit.

In the example shown in FIG. 6, the maximum value of the overcommit ratio is "1". The upper limit of the overcommit ratio is stored in the storage unit 28, and is "3" here. In this case, the determination unit 24 determines that the maximum value "1" of the overcommit ratio is equal to or less than the upper limit "3", and stores the determination result including the calculated overcommit ratio in the storage unit 28.

When the maximum value of the overcommit ratio is equal to or less than the upper limit, the execution unit 25 executes the allocation or release of resources to the MEC server group 3 located in each area, and when the maximum value of the overcommit ratio exceeds the upper limit, the execution unit 25 refrains from executing the allocation or release of resources. That is, the execution unit 25 compares the maximum value of the overcommit ratio of the determination result stored in the storage unit 28 with the upper limit, and executes the allocation or release of resources according to the comparison result.

The resource monitor unit 26 monitors the utilization status of the resources of the MEC server group 3, and stores the utilization status of the resources in the storage unit 28. Resources include, for example, CPU, memory, CPU, and disk capacity. The determination unit 24 refers to the resource utilization status stored in the storage unit 28, and acquires the existing resources necessary for calculating the overcommit ratio. Further, when the calculated overcommit ratio exceeds the upper limit, the determination unit 24 changes the allocation of resources with reference to the resource utilization status stored in the storage unit 28.

When the maximum value of the overcommit ratio exceeds the upper limit, the determination monitor unit 27 outputs an alert (first alert). Specifically, the determination monitor unit 27 refers to the determination result and the upper limit of the overcommit ratio stored in the storage unit 28, and compares the maximum value of the overcommit ratio included in the determination result with the upper limit. When the maximum value of the overcommit ratio exceeds the upper limit, the determination monitor unit 27 generates an alert and transmits the alert to an administrator terminal 6. An alert is a warning that indicates that an event in which the overcommit ratio exceeds the upper limit may occur, and that the performance of the functions, services and the like of the target MEC server group 3 may deteriorate. When the maximum value of the overcommit ratio is equal to or less than the upper limit, the determination monitor unit 27 terminates the processing without generating an alert.

For example, when each MEC server group 3 in each area (area A-1-α, area A-1-β, area A-1-γ, and area A-1-δ) has resources for two mobile terminals, and the resources to be committed in each area are the resources for four, two, two, and one mobile terminal, respectively, the overcommit ratio for each area is 2, 1, 1, and 0.5, respectively. Here, the upper limit of the overcommit ratio is "1". In this case, since the maximum value "2" of the overcommit ratio included in the determination result exceeds the upper limit "1", the determination monitor unit 27 transmits an alert to the administrator terminal 6. It is noted that the determination monitor unit 27 may include an interface that allows the occurrence of an alert to be monitored or acquired from the outside.

The administrator terminal 6 is an external terminal used by a resource administrator such as a maintenance person. The administrator terminal 6 receives the alert transmitted from the resource allocation device 2, and displays the alert on a display or the like to present the alert to the resource administrator. The resource administrator detects the alert and takes measures to avoid the occurrence of the alert, such as increasing the resources of the MEC server group 3, and changing the functions/services provided by the MEC server group 3.

(Operation of Resource Allocation Device)

FIG. 7 is a sequence diagram showing the operation of the resource allocation device 2 according to the present embodiment.

The resource monitor unit 26 monitors the utilization status of the resources of the MEC server group 3 (S11), and stores (saves) the utilization status of the resources in the storage unit 28 (S12). It is noted that the resource monitor unit 26 constantly monitors the resource utilization status. Thus, the storage unit 28 stores the resource utilization status of the MEC server group 3 in chronological order.

The location acquisition unit 21 acquires network information about the location of the mobile terminal 5 from the network device 4 (S13), and stores the network information in the storage unit 28 (S14). The network information is, for example, connection information to a base station that indicates in which base station cell the mobile terminal 5 is located. It is noted that the location acquisition unit 21 acquires the network information of each mobile terminal 5 from the network device 4 at a predetermined timing (predetermined time interval). Thus, the storage unit 28 stores the network information about the location of each mobile terminal 5 in chronological order.

The speed/route acquisition unit 22 refers to the network information of each mobile terminal 5 stored in the storage unit 28 in chronological order (S15), acquires the movement speed and the movement route of each mobile terminal 5 for every unit time, and stores the movement speed and the movement route in the storage unit 28 (S16).

The course estimation unit 23 refers to the movement speed and the movement route of each mobile terminal 5 stored in the storage unit 28 (S17), and stores the probability that each mobile terminal is located in each area at the time of prediction in the storage unit 28 as the course estimation result of each mobile terminal 5 (S18).

The determination unit 24 refers to the course estimation result, the resource utilization status, the upper limit of the overcommit ratio and the like stored in the storage unit 28 (S19). The determination unit 24 calculates, for each area, the number (expected value) of mobile terminals in the area using the probability of the course estimation result, determines whether the maximum value of the overcommit ratio for each area calculated based on the calculated number of mobile terminals exceeds the upper limit, and stores the determination result in the storage unit 28 (S20). The detailed processing of the determination unit 24 will be described later.

The execution unit 25 refers to the determination result stored in the storage unit 28 (S21), and when the maximum value of the overcommit ratio is equal to or less than the upper limit, executes the allocation or release of the resources of the MEC server group 3 (S22). The detailed processing of the execution unit 25 will be described later.

It is noted that when the maximum value of the overcommit ratio exceeds the upper limit, the execution unit 25 terminates the processing without executing the allocation or release of the resources of the MEC server group 3. In this case, since the determination monitor unit 27 constantly monitors the determination result stored in the storage unit 28, when the determination monitor unit 27 detects that the determination result in which the maximum value of the overcommit ratio exceeds the upper limit is stored in the storage unit 28, the determination monitor unit 27 generates an alert and transmits the alert to the administrator terminal 6. The detailed processing of the determination monitor unit 27 will be described later.

(Operation of Determination Unit)

FIG. 8 is a flowchart specifically showing the processing of the determination unit 24 in S19 and S20 shown in FIG. 7.

The determination unit 24 acquires the course estimation result from the storage unit 28 (S31). The course estimation result indicates, for example, as shown in FIG. 5, the probability that each mobile terminal is located in each area at the time of prediction. The determination unit 24 calculates, for each area, the number (expected value) of the mobile terminals in the area using the course estimation result and determines the resources to be committed based on the number of the mobile terminals in the area (S32). In the example shown in FIG. 6, the determination unit 24 rounds up the number of mobile terminals in the area to the nearest whole number to determine the resources to be committed.

The determination unit 24 acquires the resource utilization status and the upper limit of the overcommit ratio from the storage unit 28 (S33). The determination unit 24 calculates the overcommit ratio for each area by dividing the "resources to be committed" by the "existing resources" of the MEC server group 3 that is the target of the resource utilization status. The determination unit 24 determines whether the maximum value of the overcommit ratio for each area is equal to or less than the upper limit (S34). When the maximum value is equal to or less than the upper limit (S34: YES), the determination unit 24 stores the determination result including the calculated overcommit ratio in the storage unit 28 (S35).

When the maximum value exceeds the upper limit (S34: NO), the determination unit 24 stores the determination result including the calculated overcommit ratio in the storage unit 28 (S36). Then, the determination unit 24 changes the method of allocating the resources of the MEC server group 3 so that the overcommit ratio does not exceed the upper limit (S37). For example, the determination unit 24 does not overcommit to the same CPU, but commits to another CPU.

When the number of times of executing S37 is less than the predetermined number of times (S38: NO), the determination unit 24 returns to S34, and repeats the subsequent processing. When the number of times of executing S37 reaches the predetermined number of times (S38: YES), the determination unit 24 determines that it is impossible to allocate the resources of the MEC server group 3 so as not to exceed the upper limit of the overcommit ratio, and terminates the processing.

(Operation of Execution Unit)

FIG. 9 is a flowchart specifically showing the processing of the execution unit 25 in S21 and S22 shown in FIG. 7.

The execution unit 25 acquires a determination result including the overcommit ratio for each area from the storage unit 28 (S41). When the maximum value of the overcommit ratio is equal to or less than the upper limit of the overcommit ratio stored in the storage unit 28 (S42: YES), the execution unit 25 executes the allocation or release of the resources to the MEC server group 3. When the maximum value of the overcommit ratio exceeds the upper limit (S42: NO), the execution unit 25 terminates the processing without executing the allocation or release of the resources.

(Operation of Determination Monitor Unit)

FIG. 10 is a flowchart specifically showing the processing of the determination monitor unit 27. The determination monitor unit 27 acquires a determination result including the overcommit ratio for each area from the storage unit 28 (S51). When the maximum value of the overcommit ratio exceeds the upper limit of the overcommit ratio stored in the storage unit 28 (S45: YES), the determination monitor unit 27 generates an alert (S53).

An alert is a warning that indicates that an event in which the overcommit ratio exceeds the upper limit may occur, and that the performance of the functions, services and the like of the target MEC server group 3 may deteriorate. The determination monitor unit 27 transmits the generated alert to the administrator terminal 6 (S54). In addition, the determination monitor unit 27 may include an interface that allows the occurrence of an alert to be monitored or acquired from the outside.

When the maximum value of the overcommit ratio is equal to or less than the upper limit (S52: NO), the determination monitor unit 27 terminates the processing. It is noted that, in the present embodiment, when the maximum value of the overcommit ratio is equal to or less than the upper limit as a result of the determination unit 24 changing the allocation of resources in S37 of FIG. 8, the processing is terminated without creating an alert.

The resource allocation device 2 of the present embodiment described above includes: the course estimation unit 23 that estimates a course of each mobile terminal 5 based on network information about a location of the mobile terminal 5 acquired from the network device 4, and estimates a probability that each mobile terminal 5 is located in each area at the time of prediction; the determination unit 24 that calculates, for each area, the number of mobile terminals 5 in the area using the probability and determines whether the maximum value of an overcommit ratio for each area calculated based on the number of mobile terminals in the area exceeds an upper limit; and the execution unit 25 that executes the allocation or release of resources to the MEC server group 3 (virtual server) located in each area when the maximum value of the overcommit ratio is equal to or less than the upper limit, and refrains from executing the allocation or release of the resources to the MEC server group 3 when the maximum value of the overcommit ratio exceeds the upper limit.

As described above, in the present embodiment, instead of overcommitting uniformly at all times, the overcommitment is controlled based on the course estimation result of the mobile terminal 5 calculated for each probability by utilizing the network information. In addition, in the present embodiment, by utilizing the network information to control the timing of resource release, the resource allocation status can be adjusted to the actual status of the mobile terminal, and the apparent increase in the overcommit ratio can be avoided. Therefore, in the present embodiment, it is possible to control overcommitment according to the movement status of a mobile terminal and utilizes resources effectively.

In addition, in the present embodiment, when the MEC-specific functions and services provided by the resources of the MEC server group 3 are operated, the overcommitment of shared resources such as CPU and memory, and that overcommitment can be dynamically controlled by utilizing the network information. Thus, in the present embodiment, it is possible to efficiently utilize resources that are limited in quantity.

In addition, in the present embodiment, by improving the accuracy of the course estimation result of the mobile terminal 5 and the resource allocation determination result based on the course estimation result, the accommodation rate of the mobile terminal 5 can be efficiently improved from the design stage of the system.

Further, in the present embodiment, the geographical hierarchical structure of the MEC server group 3 can be utilized to associate the real-time resource utilization status of the MEC server group 3 and the network information about the location of the mobile terminal 5 with the current resource allocation. Moreover, in the present embodiment, by estimating the course of the mobile terminal 5 based on the accumulated network information about the location of the mobile terminal 5 and performing resource allocation in consideration of the association, it is possible to efficiently utilize limited resources.

As described above, in the present embodiment, in a system in which the MEC server group 3 having a hierarchical structure according to a regional division, the mobile terminal 5, and the cloud server are connected via the network, the resources of the MEC server group 3 can be efficiently allocated to the functions and services provided by the MEC server group 3.

Second Embodiment

In the present embodiment, handover information is used as the network information acquired by the location acquisition unit 21 of the resource allocation device 2. The handover information is one type of connection information between the mobile terminal and the base station.

By utilizing this handover information, it is possible to specify the resources of the MEC server group in which area are to be used at the timing when the mobile terminal is connected to the base station in the area, regardless of the absolute location of the mobile terminal. Further, as compared with the case in which the information of the terminal alone such as GPS is used, the resources to be used by the MEC server group 3 can be determined and the resources not to be used can be released at an early stage. Here, it is assumed that different base stations have jurisdiction over different areas.

In the case of the estimation result shown in FIG. 5, the candidate areas for the mobile terminal c at time t=3 (a.u.) are the area A-1-α, area A-1-β, area A-1-γ and area A-1-δ. At time t=3 (a.u.), for example, when the mobile terminal c moves to the area A-1-α, the mobile terminal c and the MEC server group located in the area A-1-α must be connected via the base station having jurisdiction over the area A-1-α.

At time t=2 (a.u.), the mobile terminal c is located in the area A-1-δ, and is connected to the MEC server group in the area via the base station in the area. Therefore, a handover is performed between the base station having jurisdiction over the area A-1-δ and the base station having jurisdiction over the area A-1-α between the time t=2 (a.u.) and the time t=3 (a.u.). That is, the location acquisition unit 21 subscribes (receives) the handover information for carrying out this handover from the network device 4, thereby, the resources to be used can be determined before the mobile terminal actually connects to the MEC server group, and the resources that are not used can be released.

When information acquired only by the terminal (e.g., GPS) is used, not only the allocation or release of resources cannot be determined unless the absolute location of the mobile terminal changes, but also if the acquired absolute location of the mobile terminal is incorrect, resources may not be allocated properly.

In the present embodiment, handover information (network information) that mediates the connection between the mobile terminal and the MEC server group is utilized in order to grasp the location of the mobile terminal and estimate the course of the mobile terminal, rather than information on the terminal alone such as GPS. Thus, in the present embodiment, it is possible to specify the resources of the MEC server group 3 in which area are to be used when the mobile terminal is connected to the base station in the area where the mobile terminal is located, and it is possible to determine the resources to be used and release the resources not to be used at an early stage. Therefore, in the present embodiment, it is possible to further improve the resource utilization efficiency by resource allocation including overcommitment.

Third Embodiment

In the present embodiment, a case where the first embodiment is applied to the resource management of the MEC server group in the FaaS (Function as a Service) will be described.

The resource allocation device of the present embodiment grasps in advance the requirements of the function/service and the resources to be used when accommodating the MEC-specific FaaS (Function as a Service) in the MEC server group. Then, the resource allocation device grasps, for each area, whether the requirements of the FaaS are satisfied based on the resource allocation including the overcommitment, in light of the resource utilization status.

The resource administrator operates the MEC server group in the area where the requirements of the FaaS are satisfied with the current resources. For the MEC server groups in the areas where the requirements of the FaaS are not satisfied, including performance degradation, the resource administrator takes measures such as increasing resources and changing specifications for the functions and services provided by the MEC server group.

The determination of whether the FaaS requirements are satisfied is performed by the determination monitor unit 27 of the resource allocation device 2. Specifically, the determination monitor unit 27 determines whether the MEC server group satisfies the requirements of the FaaS by using at least one of the number of times the alert (first alert) is output when the maximum value of the overcommit ratio exceeds the upper limit, and the number of times the resource allocation is changed when the maximum value of the overcommit ratio exceeds the upper limit (FIG. 8: S37), and outputs a second alert if the requirements are not satisfied.

For example, when the number of the first alerts exceeds a first threshold, or the number of times the resource allocation is changed exceeds a second threshold, the determination monitor unit 27 determines that the requirements of the FaaS are not satisfied. The number of the first alerts and the number of times the resource allocation is changed may be the cumulative number of times or may be the number of times per predetermined unit time.

When the requirements are not satisfied, the determination monitor unit 27 generates a second alert indicating that the requirements of the FaaS are not satisfied, and transmits the second alert to the administrator terminal 6. In addition, the determination monitor unit 27 may include an interface that allows the occurrence of the second alert to be monitored or acquired from the outside.

In the present embodiment, from the perspective of the FaaS that is not aware of physical resources to which the function is to be deployed, when accommodating in the MEC server group the MEC-specific FaaS that needs to be aware of the area to be provided and the physical resources to which the function is to be deployed, it can be used to improve the accommodation rate of the FaaS to the MEC server group and to efficiently augment and maintain the facilities. This is because the entire resource is considered as having regional characteristics and real-time changes in utilization rate, rather than a uniform pool of resources, and by using network information, these changes are considered predictable along with the possibility of the FaaS performance degradation.

(Hardware Configuration of Resource Allocation Device)

Figure 11:
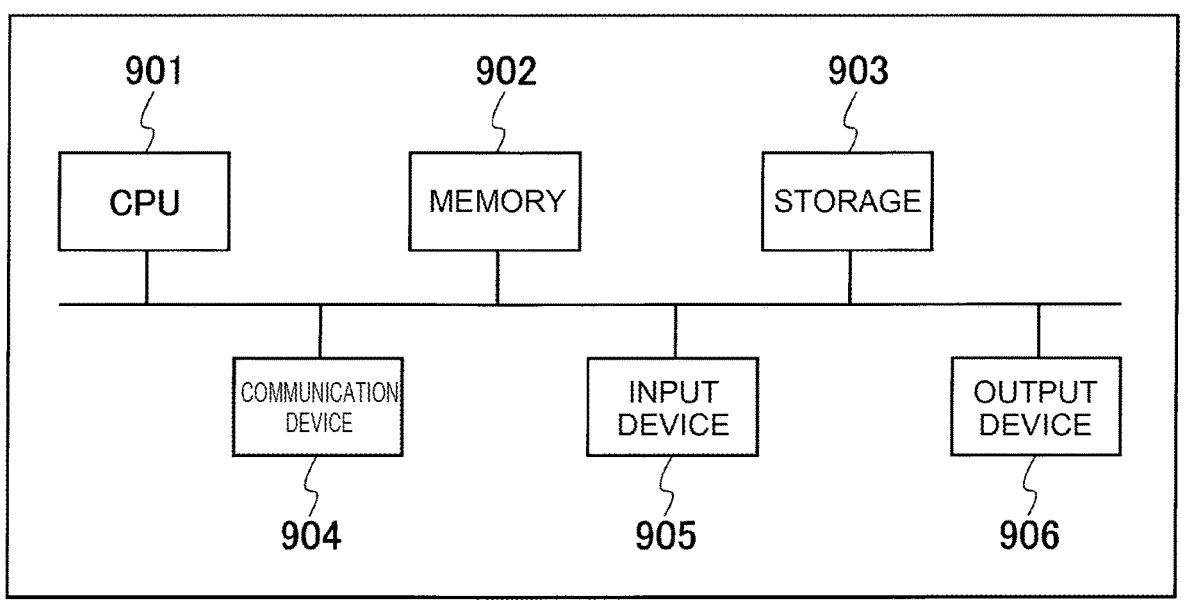
FIG. 11 shows an example of a hardware configuration of the resource allocation device.

It is noted that a general-purpose computer system as shown in FIG. 11 can be used for the resource allocation device 2 described above, for example. The illustrated computer system includes a CPU (Central Processing Unit, processor) 901, a memory 902, a storage 903 (HDD: Hard Disk Drive, SSD: Solid State Drive), a communication device 904, an input device 905, and an output device 906. The memory 902 and the storage 903 are storage devices. In this computer system, the CPU 901 executes a predetermined program loaded on the memory 902, thereby realizing the function of the resource allocation device 2. Further, the resource allocation device 2 may be implemented by a single computer or a plurality of computers. Moreover, the resource allocation device 2 may be a virtual machine implemented in a computer.

The program of the resource allocation device 2 can be stored in a computer-readable recording medium such as an HDD, SSD, USB (Universal Serial Bus) memory, CD (Compact Disc) and DVD (Digital Versatile Disc), or can be distributed via a network.

Other Embodiments

It is noted that the present invention is not limited to the above embodiments, and many modifications are possible within the scope of the gist thereof.

For example, the determination unit 24 of the above embodiments calculates the "number of terminals in the area" (expected value) shown in FIG. 6 by summing up the percentage (course estimation result) of each mobile terminal 5 in the area. However, the determination unit 24 may calculate the overcommit ratio using a safety value obtained by multiplying the "number of terminals in the area" by a predetermined safety coefficient. In addition, the determination unit 24 may calculate the overcommit ratio using a calculated value determined by applying a predetermined formula unique to the user to the "number of terminals in the area".

In addition, the determination unit 24 may fixedly use every time or dynamically change any of the expected value of the above embodiment, the safety value obtained by multiplying the expected value by a predetermined safety coefficient, and the calculated value obtained by applying a mathematical formula to the expected value.

In the case of dynamic change, for example, the determination unit 24 may improve the resource utilization rate by using the difference between the determination result of the past resource allocation and the actual resource utilization status, or may choose the safer option to reduce the resource utilization rate. That is, the determination unit 24 may dynamically change the calculation method of the "number of terminals in the area" for calculating the overcommit ratio by using the feedback control.

Therefore, the determination unit 24 of the present invention may use as the number of terminals in the area, at least one of an expected value obtained by summing up the probabilities, a safety value obtained by multiplying the expected value by a safety coefficient, and a calculated value obtained by applying a predetermined formula to the expected value.

REFERENCE SIGNS LIST

1 Cloud server
2 Resource allocation device
21 Location acquisition unit
22 Speed/route acquisition unit
23 Course estimation unit
24 Determination unit
25 Execution unit
26 Resource monitor unit
27 Determination monitor unit
28 Storage unit
3 MEC server group
4 Network device
5 Mobile terminal
6 Administrator terminal

The invention claimed is:

1. A resource allocation device comprising:
one or more processors configured to:
estimate a course of each mobile terminal based on network information about a location of the mobile terminal acquired from a network device;
estimate a probability that each mobile terminal is located in each area at time of prediction;
calculate, for each area, a number of mobile terminals in the area using the probability and determine whether a maximum value of an overcommit ratio for each area calculated based on the number of mobile terminals in the area exceeds an upper limit; and
based on the maximum value of the overcommit ratio being equal to or less than the upper limit, execute allocation or release of resources to a virtual server group located in each area; and
based on the maximum value of the overcommit ratio exceeding the upper limit, refrain from executing allocation or release of the resources to the virtual server group,
wherein the one or more processors are configured to calculate the overcommit ratio by dividing (i) a number of resources to be committed by (ii) a number of existing resources, the number of resources to be committed being obtained by rounding up the number of mobile terminal to a nearest whole value, and the number of existing resources being a number of resources currently allocated to the virtual server group.

2. The resource allocation device according to claim 1, wherein the one or more processors are configured to:
acquire a movement speed and a movement route of each mobile terminal based on the network information, and
estimate the course of each mobile terminal using the movement speed and the movement route.

3. The resource allocation device according to claim 1, comprising:
a determination monitor configured to, based on the maximum value of the overcommit ratio exceeding the upper limit, output a first alert.

4. The resource allocation device according to claim 1, wherein the network information is handover information transmitted when the mobile terminal performs a handover from a base station to which the mobile terminal is connected to another base station.

5. The resource allocation device according to claim 3, wherein
the determination monitor is configured to determine, by using at least one of:
a number of the first alerts; and
a number of times the resource allocation is changed when the maximum value of the overcommit ratio exceeds the upper limit, whether a requirement of the FaaS (Function as a Service) of the virtual server group is satisfied, and, if the requirement is not satisfied, output a second alert.

6. The resource allocation device according to claim 1, wherein the one or more processors are configured to use, as the number of terminals in the area, at least one of an expected value obtained by summing up the probabilities, a safety value obtained by multiplying the expected value by a safety coefficient, and a calculated value obtained by applying a predetermined formula to the expected value.

7. A resource allocation method performed by a resource allocation device, the resource allocation method comprising:
estimating (i) a course of each mobile terminal based on network information about a location of the mobile terminal acquired from a network device, and (ii) a probability that each mobile terminal is located in each area at time of prediction;
calculating, for each area, a number of mobile terminals in the area using the probability and determining whether a maximum value of an overcommit ratio for each area calculated based on the number of mobile terminals in the area exceeds an upper limit; and
based on the maximum value of the overcommit ratio being equal to or less than the upper limit executing allocation or release of resources to a virtual server group located in each area, and, based on the maximum value of the overcommit ratio exceeding the upper limit, refraining from executing allocation or release of the resources to the virtual server group,
wherein the overcommit ratio is calculated by dividing (i) a number of resources to be committed by (ii) a number of existing resources, the number of resources to be committed being obtained by rounding up the number of mobile terminal to a nearest whole value, and the number of existing resources being a number of resources currently allocated to the virtual server group.

8. A non-transitory computer readable medium storing a resource allocation program that upon execution, causes a computer to perform operations comprising:
estimating (i) a course of each mobile terminal based on network information about a location of the mobile terminal acquired from a network device, and (ii) a probability that each mobile terminal is located in each area at time of prediction;

calculating, for each area, a number of mobile terminals in the area using the probability and determining whether a maximum value of an overcommit ratio for each area calculated based on the number of mobile terminals in the area exceeds an upper limit; and based on the maximum value of the overcommit ratio being equal to or less than the upper limit executing allocation or release of resources to a virtual server group located in each area, and, based on the maximum value of the overcommit ratio exceeding the upper limit, refraining from executing allocation or release of the resources to the virtual server group, wherein the overcommit ratio is calculated by dividing (i) a number of resources to be committed by (ii) a number of existing resources, the number of resources to be committed being obtained by rounding up the number of mobile terminal to a nearest whole value, and the number of existing resources being a number of resources currently allocated to the virtual server group.

9. The non-transitory computer readable medium according to claim 8, wherein the program causes the computer to perform operations comprising:

acquiring a movement speed and a movement route of each mobile terminal based on the network information; and estimating the course of each mobile terminal using the movement speed and the movement route.

10. The non-transitory computer readable medium according to claim 8, wherein the program causes the computer to perform operations comprising:

outputting a first alert when the maximum value of the overcommit ratio exceeds the upper limit.

11. The non-transitory computer readable medium according to claim 8, wherein the network information is handover information transmitted when the mobile terminal performs a handover from a base station to which the mobile terminal is connected to another base station.

12. The non-transitory computer readable medium according to claim 10, wherein the program causes the computer to perform operations comprising:

determining, by using at least one of:

a number of the first alerts; and a number of times the resource allocation is changed when the maximum value of the overcommit ratio exceeds the upper limit, whether a requirement of the FaaS (Function as a Service) of the virtual server group is satisfied, and, if the requirement is not satisfied, outputting a second alert.

13. The non-transitory computer readable medium according to claim 8, wherein the program causes the computer to perform operations comprising:

using, as the number of terminals in the area, at least one of an expected value obtained by summing up the probabilities, a safety value obtained by multiplying the expected value by a safety coefficient, and a calculated value obtained by applying a predetermined formula to the expected value.

14. The resource allocation method according to claim 7, wherein estimating the course comprises:

acquiring a movement speed and a movement route of each mobile terminal based on the network information, and estimating the course of each mobile terminal using the movement speed and the movement route.

15. The resource allocation method according to claim 7, further comprising:

outputting a first alert when the maximum value of the overcommit ratio exceeds the upper limit.

16. The resource allocation method according to claim 7, wherein the network information is handover information transmitted when the mobile terminal performs a handover from a base station to which the mobile terminal is connected to another base station.

17. The resource allocation method according to claim 15, further comprising:

determining, by using at least one of:

a number of the first alerts; and a number of times the resource allocation is changed when the maximum value of the overcommit ratio exceeds the upper limit, whether a requirement of the FaaS (Function as a Service) of the virtual server group is satisfied, and, if the requirement is not satisfied, outputting a second alert.

18. The resource allocation method according to claim 7, further comprising:

using, as the number of terminals in the area, at least one of an expected value obtained by summing up the probabilities, a safety value obtained by multiplying the expected value by a safety coefficient, and a calculated value obtained by applying a predetermined formula to the expected value.

* * * * *